United States Patent
Clark et al.

[11] Patent Number: 5,840,392
[45] Date of Patent: Nov. 24, 1998

[54] SELF-ADHERING DUCT INSULATION BOARD

[76] Inventors: Kevin H. Clark; Deborah W. Clark, both of 1810 Edwardsville Dr., Edwardsville, Kans. 66111

[21] Appl. No.: 923,479

[22] Filed: Sep. 4, 1997

[51] Int. Cl.[6] .................................................... B32B 3/30
[52] U.S. Cl. ...................... 428/40.1; 428/121; 428/163; 428/158
[58] Field of Search .................... 428/40.1, 158, 428/163, 162, 121, 130, 167; 52/232

[56] References Cited

U.S. PATENT DOCUMENTS

| | | | |
|---|---|---|---|
| 1,874,922 | 8/1932 | Delaney | 428/163 |
| 3,117,902 | 1/1964 | Holzheimer | 428/40.1 |
| 4,663,204 | 5/1987 | Langham | 52/232 |
| 4,680,071 | 7/1987 | Hughes | 156/218 |
| 4,772,507 | 9/1988 | Leo, Jr. et al. | 428/218 |
| 4,778,700 | 10/1988 | Pereira | 428/40 |
| 4,780,347 | 10/1988 | Cohen | 428/36 |
| 4,842,908 | 6/1989 | Cohen et al. | 428/34.2 |
| 5,104,701 | 4/1992 | Cohen et al. | 428/34.5 |

Primary Examiner—Alexander Thomas
Attorney, Agent, or Firm—Joseph N. Breaux

[57] ABSTRACT

A self-adhering duct insulation board having a central foam insulation board with first, second, third, and fourth parallel outer board bend channels formed into an outer surface thereof and first, second, third, and fourth parallel inner board bend channels formed into an inner surface thereof, the first, second, third, and fourth outer board bend channels being oriented in parallel with the first, second, third, and fourth inner board bend channels, each of the first, second, third, and fourth outer board bend channels being arranged in relation to one of the first, second, third, and fourth inner board bend channels in a manner to form a flexible board bending hinge; an outer foil layer permanently attached onto the outer surface of the central foam insulation board, the outer foil layer forming four foil bend channels, one into each of the first, second, third, and fourth outer board bend channels of the central foam insulation board; an inner foil layer permanently secured to the inner surface of the central foam insulation board; an adhesive layer deposited onto the inner foil layer in a manner such that the inner foil layer is positioned between the adhesive layer and the central foam insulation board; and a peel off cover sheet positioned onto the adhesive layer.

19 Claims, 2 Drawing Sheets

SELF-ADHERING DUCT INSULATION BOARD

TECHNICAL FIELD

The present invention relates to insulating materials and more particularly to a self-adhering duct insulation board that includes central foam insulation board with first, second, third, and fourth parallel outer board bend channels formed into an outer surface thereof and first, second, third, and fourth parallel inner board bend channels formed into an inner surface thereof, the first, second, third, and fourth outer board bend channels being oriented in parallel with the first, second, third, and fourth inner board bend channels, each of the first, second, third, and fourth outer board bend channels being arranged in relation to one of the first, second, third, and fourth inner board bend channels in a manner to form a flexible board bending hinge; an outer foil layer permanently attached onto the outer surface of the central foam insulation board, the outer foil layer forming four foil bend channels, one into each of the first, second, third, and fourth outer board bend channels of the central foam insulation board; an inner foil layer permanently secured to the inner surface of the central foam insulation board; an adhesive layer deposited onto the inner foil layer in a manner such that the inner foil layer is positioned between the adhesive layer and the central foam insulation board; and a peel off cover sheet positioned onto the adhesive layer; the first outer board bend channel being spaced from a first side edge of the central foam insulation board a distance of between seven and nine inches; the second outer board bend channel being spaced from the first side edge of the central foam insulation board a distance of between nine and eleven inches; the third outer board bend channel being spaced from the first side edge of the central foam insulation board a distance of between twenty-three and twenty-five inches; the fourth outer board bend channel being spaced from the first side edge of the central foam insulation board a distance of between thirty-nine and forty-one inches.

BACKGROUND OF THE INVENTION

Concerns over the cost and supply of energy have resulted in a heightened desire to better insulate dwellings. Flexible rolls or flexible or rigid bat insulation, with or without facing vapor barriers, has been used extensively in this endeavor. Typically, when heating and cooling ducts are to be insulated, the insulation material is wrapped around the duct, cut, and then held by duct tape or the like to the duct. The present invention seeks to provide improved insulation to these areas by providing a substantially rigid insulation board that is provided with a number of bend hinge areas that are positioned advantageously to allow for easy installation of the rigid insulation board about the conventional sheet metal ducting typically used in heating and cooling applications.

SUMMARY OF THE INVENTION

It is thus an object of the invention to provide a self-adhering duct insulation board that includes a substantially rigid insulation board that is provided with a number of bend hinge areas that are positioned advantageously to allow for easy installation of the rigid insulation board about conventional sheet metal heating and cooling ducts.

It is a further object of the invention to provide a self-adhering duct insulation board that includes a central foam insulation board with first, second, third, and fourth parallel outer board bend channels formed into an outer surface thereof and first, second, third, and fourth parallel inner board bend channels formed into an inner surface thereof, the first, second, third, and fourth outer board bend channels being oriented in parallel with the first, second, third, and fourth inner board bend channels, each of the first, second, third, and fourth outer board bend channels being arranged in relation to one of the first, second, third, and fourth inner board bend channels in a manner to form a flexible board bending hinge; an outer foil layer permanently attached onto the outer surface of the central foam insulation board, the outer foil layer forming four foil bend channels, one into each of the first, second, third, and fourth outer board bend channels of the central foam insulation board; an inner foil layer permanently secured to the inner surface of the central foam insulation board; an adhesive layer deposited onto the inner foil layer in a manner such that the inner foil layer is positioned between the adhesive layer and the central foam insulation board; and a peel off cover sheet positioned onto the adhesive layer; the first outer board bend channel being spaced from a first side edge of the central foam insulation board a distance of between seven and nine inches; the second outer board bend channel being spaced from the first side edge of the central foam insulation board a distance of between nine and eleven inches; the third outer board bend channel being spaced from the first side edge of the central foam insulation board a distance of between twenty-three and twenty-five inches; the fourth outer board bend channel being spaced from the first side edge of the central foam insulation board a distance of between thirty-nine and forty-one inches.

It is a still further object of the invention to provide a self-adhering duct insulation board that accomplishes both of the above objects in combination.

Accordingly, a self-adhering duct insulation board is provided. The self-adhering duct insulation board includes a central foam insulation board with first, second, third, and fourth parallel outer board bend channels formed into an outer surface thereof and first, second, third, and fourth parallel inner board bend channels formed into an inner surface thereof, the first, second, third, and fourth outer board bend channels being oriented in parallel with the first, second, third, and fourth inner board bend channels, each of the first, second, third, and fourth outer board bend channels being arranged in relation to one of the first, second, third, and fourth inner board bend channels in a manner to form a flexible board bending hinge; an outer foil layer permanently attached onto the outer surface of the central foam insulation board, the outer foil layer forming four foil bend channels, one into each of the first, second, third, and fourth outer board bend channels of the central foam insulation board; an inner foil layer permanently secured to the inner surface of the central foam insulation board; an adhesive layer deposited onto the inner foil layer in a manner such that the inner foil layer is positioned between the adhesive layer and the central foam insulation board; and a peel off cover sheet positioned onto the adhesive layer; the first outer board bend channel being spaced from a first side edge of the central foam insulation board a distance of between seven and nine inches; the second outer board bend channel being spaced from the first side edge of the central foam insulation board a distance of between nine and eleven inches; the third outer board bend channel being spaced from the first side edge of the central foam insulation board a distance of between twenty-three and twenty-five inches; the fourth outer board bend channel being spaced from the first side edge of the central foam insulation board a distance of between thirty-nine and forty-one inches.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
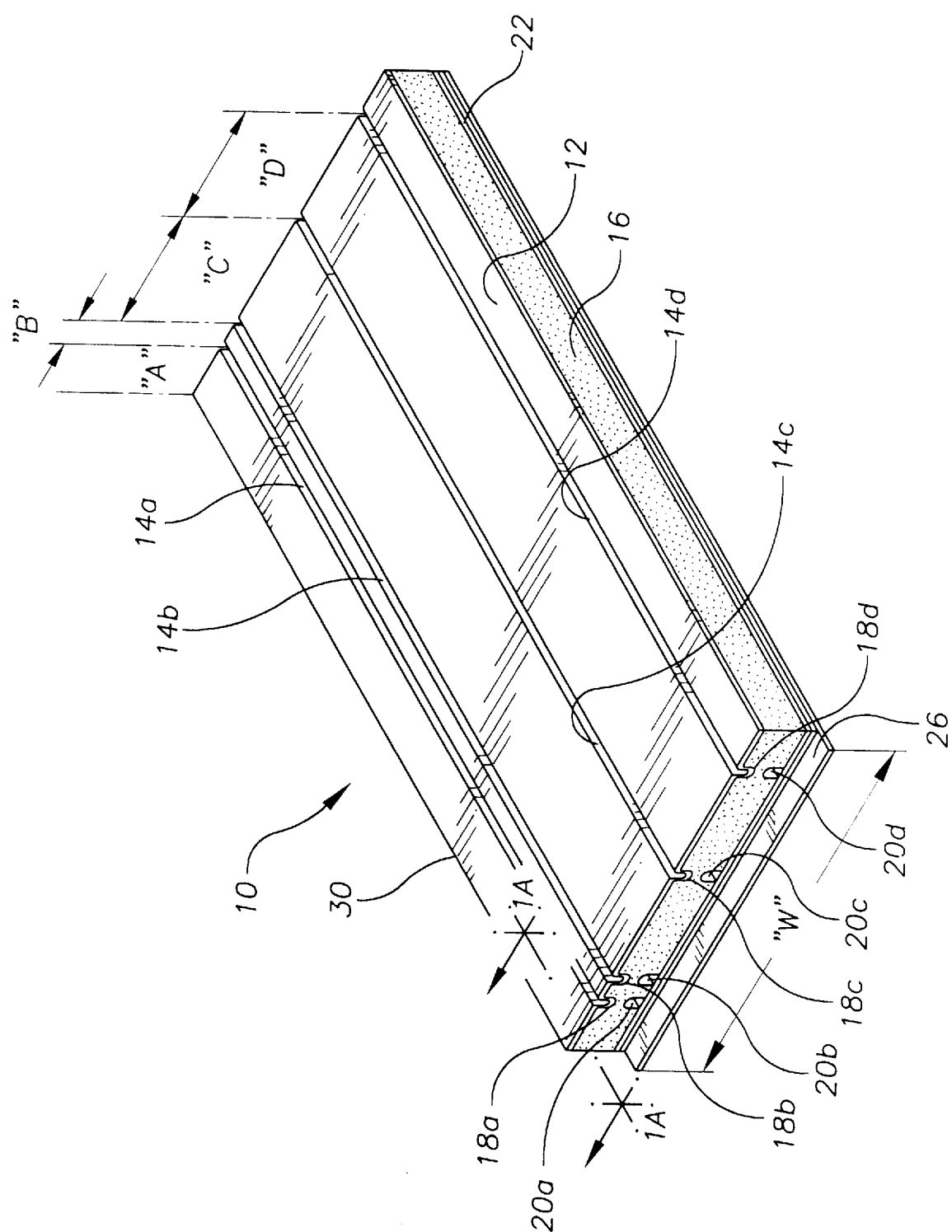
FIG. 1 is a perspective view of an exemplary embodiment of the self-adhering duct insulation board of the present invention showing the outer foil layer with the four foil bend channels formed therein, the central foam insulation board with the four outer and inner board bend channels formed therein, the inner foil layer, the adhesive layer, and the peel off cover sheet.
Figure 1A:
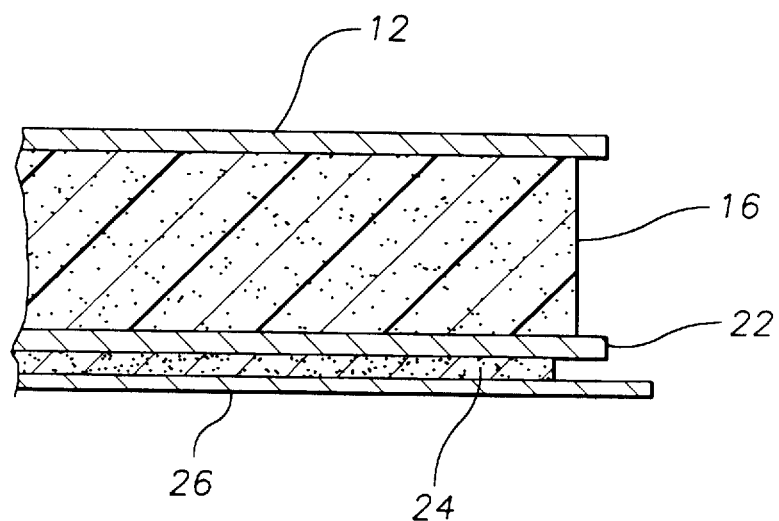
FIG. 1A is a detail cross section of the exemplary self-adhering duct insulation board of FIG. 1 showing the outer foil layer, the central foam insulation board, the inner foil layer, the adhesive layer, and the peel off cover sheet.

FIGS. 1 and 1A show an exemplary embodiment of the self-adhering duct insulation board of the present invention generally designated by the numeral 10. In this embodiment, duct insulation board 10 includes an outer metal foil layer 12 having four foil bend channels 14a–d formed therein; a central foam insulation board 16 having first, second, third, and fourth parallel outer board bend channels 18a–d (more clearly shown in FIG. 2), respectively, formed into an outer surface thereof and first, second, third, and fourth parallel inner board bend channels 20a–d (more clearly shown in FIG. 2) formed into an inner surface thereof; an inner metal foil layer 22; an adhesive layer 24 (FIGS. 1A and 2), and a peel off cover sheet 26.

In this embodiment, central foam insulation board 16 is a section of one inch thick plastic foam insulation having a width "W" of forty-eight inches and a length of ninety-six inches. First outer board bend channel 18a is spaced a distance "A" of eight inches from a first side edge 30 of central foam insulation board 16. Second outer board bend channel 18b is spaced a distance "B" of ten inches from first side edge 30 of central foam insulation board 16. Third outer board bend channel 18c is spaced a distance "C" of twenty-four inches from first side edge 30 of central foam insulation board 16. Fourth outer board bend channel 18d is spaced a distance "D" of eight inches from first side edge 30 of central foam insulation board 16.

Figure 2:
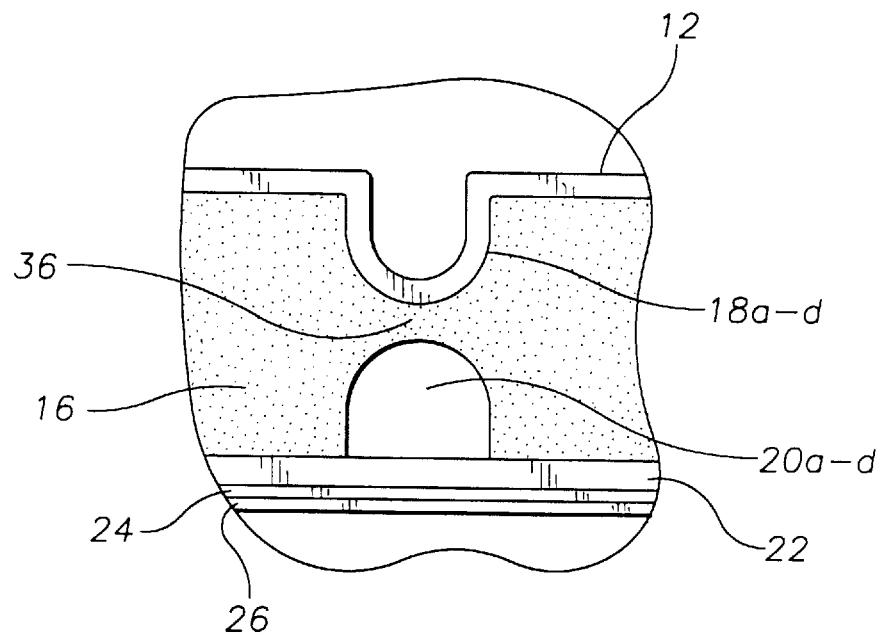
FIG. 2 is a detail end view of the self-adhering duct insulation board of the present invention showing one of the four outer board bend channels, one of the inner board bend channels, a section of the outer foil layer with one of the four foil bend channels formed into the outer board bend channel, a section of the inner foil layer secured across the inner board bend channel, the adhesive layer, and the peel off cover sheet.

With reference to FIG. 2, each of the first, second, third, and fourth outer board bend channels 18a–d is oriented in parallel with the first, second, third, and fourth inner board bend channels 20a–b and each of the first, second, third, and fourth outer board bend channels 18a–d is arranged in relation to one of the first, second, third, and fourth inner board bend channels 20a–d in a manner to form a flexible board bending hinge 36 that is easily bent when installing self-adhering duct insulation board 10 (FIG. 1) about a section of duct.

It can be seen from the preceding description that a self-adhering duct insulation board has been provided that includes a substantially rigid insulation board that is provided with a number of bend hinge areas that are positioned advantageously to allow for easy installation of the rigid insulation board about conventional sheet metal heating and cooling ducts; and that includes a central foam insulation board with first, second, third, and fourth parallel outer board bend channels formed into an outer surface thereof and first, second, third, and fourth parallel inner board bend channels formed into an inner surface thereof, the first, second, third, and fourth outer board bend channels being oriented in parallel with the first, second, third, and fourth inner board bend channels, each of the first, second, third, and fourth outer board bend channels being arranged in relation to one of the first, second, third, and fourth inner board bend channels in a manner to form a flexible board bending hinge; an outer foil layer permanently attached onto the outer surface of the central foam insulation board, the outer foil layer forming four foil bend channels, one into each of the first, second, third, and fourth outer board bend channels of the central foam insulation board; an inner foil layer permanently secured to the inner surface of the central foam insulation board; an adhesive layer deposited onto the inner foil layer in a manner such that the inner foil layer is positioned between the adhesive layer and the central foam insulation board; and a peel off cover sheet positioned onto the adhesive layer; the first outer board bend channel being spaced from a first side edge of the central foam insulation board a distance of between seven and nine inches; the second outer board bend channel being spaced from the first side edge of the central foam insulation board a distance of between nine and eleven inches; the third outer board bend channel being spaced from the first side edge of the central foam insulation board a distance of between twenty-three and twenty-five inches; the fourth outer board bend channel being spaced from the first side edge of the central foam insulation board a distance of between thirty-nine and forty-one inches.

It is noted that the embodiment of the self-adhering duct insulation board described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A self-adhering duct insulation board comprising:

a central foam insulation board with first, second, third, and fourth parallel outer board bend channels formed into an outer surface thereof and first, second, third, and fourth parallel inner board bend channels formed into an inner surface thereof, said first, second, third, and fourth outer board bend channels being oriented in parallel with said first, second, third, and fourth inner board bend channels, each of said first, second, third, and fourth outer board bend channels being arranged in relation to one of said first, second, third, and fourth inner board bend channels in a manner to form a flexible board bending hinge;

an outer foil layer permanently attached onto said outer surface of said central foam insulation board, said outer foil layer forming four foil bend channels, one into each of said first, second, third, and fourth outer board bend channels of said central foam insulation board;

an inner foil layer permanently secured to said inner surface of said central foam insulation board;

an adhesive layer deposited onto said inner foil layer in a manner such that said inner foil layer is positioned between said adhesive layer and said central foam insulation board; and a peel off cover sheet positioned onto said adhesive layer;

said first outer board bend channel being spaced from a first side edge of said central foam insulation board a distance of between seven and nine inches;

said second outer board bend channel being spaced from said first side edge of said central foam insulation board a distance of between nine and eleven inches;

said third outer board bend channel being spaced from said first side edge of said central foam insulation board a distance of between twenty-three and twenty-five inches;

said fourth outer board bend channel being spaced from said first side edge of said central foam insulation board a distance of between thirty-nine and forty-one inches.

2. The self-adhering duct insulation board of claim 1, wherein:

said central foam insulation board has a width of between forty-seven and forty-nine inches.

3. The self-adhering duct insulation board of claim 2, wherein:

said first outer board bend channel is spaced from said first side edge of said central foam insulation board a distance of between eight inches.

4. The self-adhering duct insulation board of claim 3 wherein:

said second outer board bend channel being spaced from said first side edge of said central foam insulation board a distance of ten inches.

5. The self-adhering duct insulation board of claim 4 wherein:

said third outer board bend channel being spaced from said first side edge of said central foam insulation board a distance of twenty-four inches.

6. The self-adhering duct insulation board of claim 5 wherein:

said fourth outer board bend channel being spaced from said first side edge of said central foam insulation board a distance of forty inches.

7. The self-adhering duct insulation board of claim 4 wherein:

said fourth outer board bend channel being spaced from said first side edge of said central foam insulation board a distance of forty inches.

8. The self-adhering duct insulation board of claim 3 wherein:

said third outer board bend channel being spaced from said first side edge of said central foam insulation board a distance of twenty-four inches.

9. The self-adhering duct insulation board of claim 7 wherein:

said fourth outer board bend channel being spaced from said first side edge of said central foam insulation board a distance of forty inches.

10. The self-adhering duct insulation board of claim 2 wherein:

said second outer board bend channel being spaced from said first side edge of said central foam insulation board a distance of ten inches.

11. The self-adhering duct insulation board of claim 2 wherein:

said third outer board bend channel being spaced from said first side edge of said central foam insulation board a distance of twenty-four inches.

12. The self-adhering duct insulation board of claim 2 herein:

said fourth outer board bend channel being spaced from said first side edge of said central foam insulation board a distance of forty inches.

13. The self-adhering duct insulation board of claim 1, wherein:

said first outer board bend channel is spaced from said first side edge of said central foam insulation board a distance of between eight inches.

14. The self-adhering duct insulation board of claim 13 wherein:

said second outer board bend channel being spaced from said first side edge of said central foam insulation board a distance of ten inches.

15. The self-adhering duct insulation board of claim 14 wherein:

said third outer board bend channel being spaced from said first side edge of said central foam insulation board a distance of twenty-four inches.

16. The self-adhering duct insulation board of claim 15 wherein:

said fourth outer board bend channel being spaced from said first side edge of said central foam insulation board a distance of forty inches.

17. The self-adhering duct insulation board of claim 1 wherein:

said second outer board bend channel being spaced from said first side edge of said central foam insulation board a distance of ten inches.

18. The self-adhering duct insulation board of claim 1 wherein:

said third outer board bend channel being spaced from said first side edge of said central foam insulation board a distance of twenty-four inches.

19. The self-adhering duct insulation board of claim 1 wherein: said fourth outer board bend channel being spaced from said first side edge of said central foam insulation board a distance of forty inches.

* * * * *